Jan. 13, 1931.  J. W. ANDERSON  1,788,373
SPRING DEVICE
Filed July 14, 1928
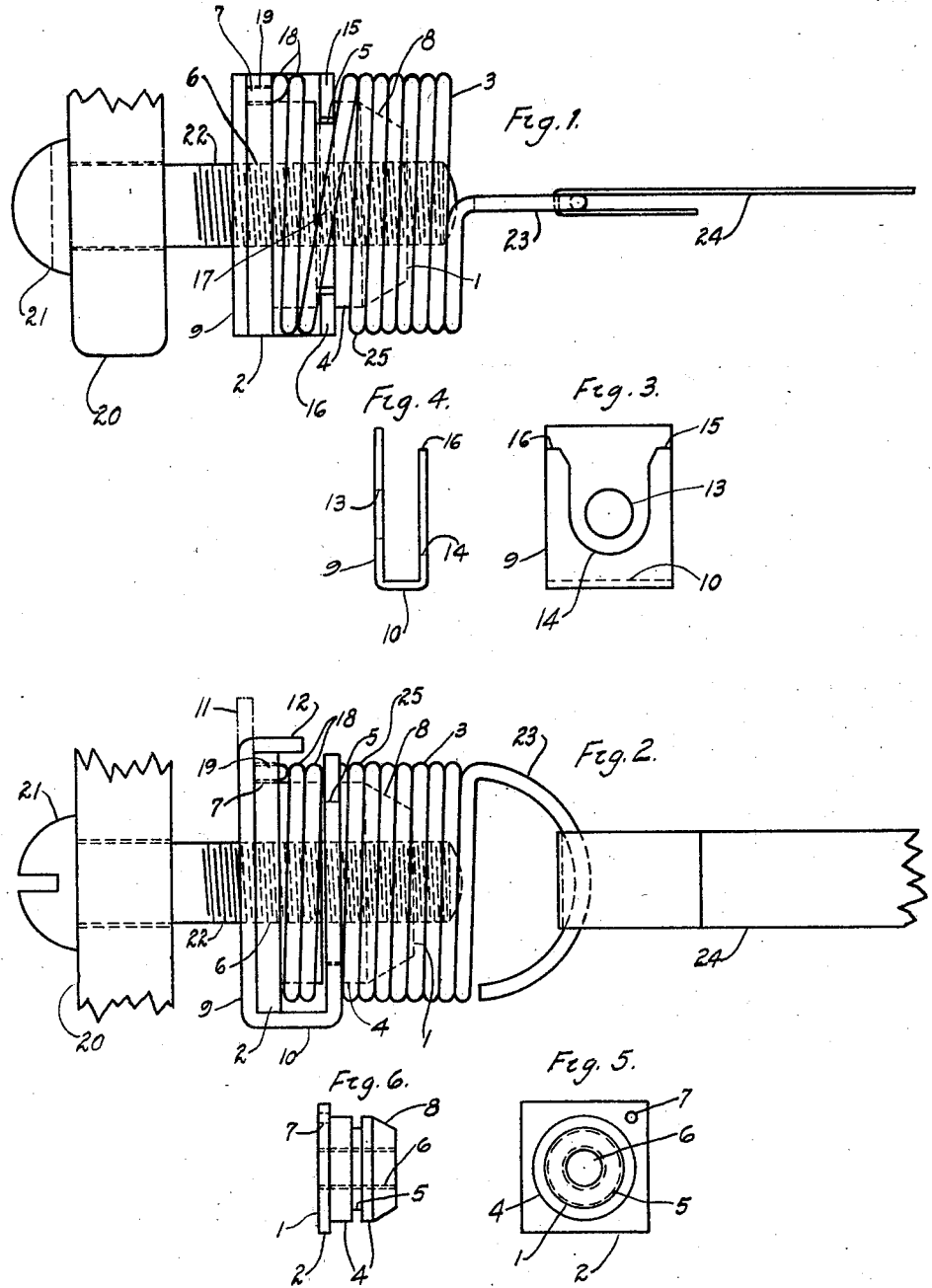
INVENTOR.
James W. Anderson
BY
Geo. B. Ingersoll.
ATTORNEY.

Patented Jan. 13, 1931

1,788,373

UNITED STATES PATENT OFFICE

JAMES W. ANDERSON, OF DETROIT, MICHIGAN, ASSIGNOR TO MONARCH GOVERNOR CO., OF DETROIT, MICHIGAN

SPRING DEVICE

Application filed July 14, 1928. Serial No. 292,627.

My invention relates to improvements in spring devices requiring adjusting means; and the objects of my improvements are: first, to provide a spring device having means for quickly changing the characteristics of the spring; second, to provide an anchorage for a coil spring that will permit of the functioning of the spring without distortion of its working coils; third, to provide a spring device that will permit of varying the number of working coils as well as the working position of the entire spring device; fourth, to provide a spring device that will permit of precision adjustments of the spring; and fifth, to provide a spring device with an anchorage applied between the coils of the spring.

I attain these objects by the mechanism illustrated in the following drawing, in which—

Figure 1, is a plan view of the spring device connected to a base and to a spring controlled member; Fig. 2, a side view of the spring device connected to a base and a spring controlled member; Fig. 3, a side view of the spring clamp; Fig. 4, an end view of the spring clamp; Fig. 5, an end view of the adjusting nut; and Fig. 6, a side view of the adjusting nut.

Similar numerals refer to similar parts throughout the several views.

The nut 1 is provided with a shoulder 2 against which fits the spring 3 as it telescopes over the pilot 4. The nut 1 is further provided with a groove 5 and a threaded hole 6. The nut 1 is also provided with a hole 7. The nut 1 may be chamfered at its inner end as at 8.

The clamp 9 fits against the shoulder 2 on the nut 1, one of the flats of the shoulder 2 fitting against the bridge 10 of the clamp 9, thus preventing any relative motion therebetween. If it is desired, the clamp 9 may be provided with sufficient length, as shown by dotted lines 11 in Fig. 2, to allow for bending over the shoulder 2 as at 12, thus positively preventing the clamp 9 from loosening from the nut 1. The clamp 9 has a hole 13 and an open end 14, which is provided with arms 15 and 16. The arms 15 and 16 and the open end 14 of the clamp 9 fit in the groove 5 of the nut 1, the arms 15 and 16 being forced between two of the coils of the spring 3. It is to be noted that a portion 17 of one of the coils of the spring 3 passes between the arms 15 and 16 of the clamp 9, the first two full coils 18 being held between the rear wall and the arms 15 and 16 of the clamp 9. The spring 3 may be provided with an extension 19 for engaging the hole 7 in the nut 2, thus locking the spring 3 from revolving on the nut 2. The remaining coils of the spring 3 outside of the clamp 2 will remain free and undistorted, thus allowing for proper functioning as a spring, the spring 3 standing perpendicular to the shoulder 2 of the nut 1. It is to be noted that the arms 15 and 16 engage the groove 5 of the nut 1 and thus provide for the tension load of the spring to be taken through the nut 1 instead of through the bridge 10 of the clamp 9. The boss 20 may be a part of a required base or housing. The adjusting screw 21 passes through a hole in the boss 20 and has a threaded end 22 engaging the threaded hole 6 of the nut 2. The spring 3 has an extension 23 for attaching a member 24 for connecting to any desired mechanism (not shown) requiring an adjustable and resilient control means. It is to be noted that, if it is desired to use the extension 19 of the spring 3 in the hole 7, the head 2 of the nut 1 may be round, thus permitting of easier manufacture. Also if the square head 2 is used, the extension 19 and the hole 7 may be eliminated if desirable. Also it is to be noted that the use of the open end 14 of the clamp 9, together with its arms 15 and 16 interposed between the coils, renders the character of the contact of coil 25 with the open end of the clamp 9 that of a spring having its contact end ground flat.

As soon as the adjusting screw 21 engages the nut 1 in an assembled position, the nut 1 and the clamp 9 are locked together. It is to be noted that my invention may be used as a spring terminal or connection of either an adjustable or permanent character. It is particularly advantageous when the characteristics of a spring need to be changed with precision. This can be accomplished quickly by increasing or decreasing the effective working length of the spring 3 by means of its adjustable features, thus eliminating removal, cutting, or replacement of the spring. This provides one spring to meet many different requirements and with its adjustable mechanism is easily applied or disassembled. Because of its effective and precise adjustment of the characteristics of a spring, my invention will be easily adapted to any mechanism incorporating adjustable features and will be particularly adapted to governing mechanisms for internal combustion engines.

I claim:

1. In a spring device, the combination of a nut having an external groove, said nut being further provided with a shoulder having a flat, a spring telescopically mounted on said nut, a clamp mounted on said nut, said clamp having means engaging the flat on the shoulder of said nut, said clamp being further provided with means engaging the groove of said nut together with said spring, and means for adjustably engaging said nut.

2. In a device comprising an adjusting nut, the combination of a coil spring mounted on said nut and a forked member for holding a portion of the coils of said spring against longitudinal movement, a forked member being locked from rotation on said nut.

3. In a spring device, the combination of a nut having a groove, said nut being provided with a shoulder, a spring mounted on said nut, said spring having an extension engaging the shoulder on said nut, a member mounted on said nut, said member having means engaging the shoulder and the groove of said nut, said member being further provided with means for engaging said spring, and means for adjustably engaging said nut.

4. In a spring device, the combination of a nut, a coil spring mounted on said nut, an U-shaped member engaging said nut at its end and at an intermediate point, said U-shaped member further engaging said spring, and means for adjustably engaging said nut through said U-shaped member.

5. In a device comprising a coil spring telescoping over a nut, an U-shaped member engaging said nut, said U-shaped member further engaging said spring in such manner as to enclose one or more of the coils between the arms of said U-shaped member.

6. In a spring device, the combination of a nut, an attaching spring having a plurality of coils, said attaching spring being mounted on said nut, means for rendering inoperative one or more of the coils of said attaching spring, said means having a plurality of arms engaging said nut, and means for adjustably engaging said nut.

7. In a spring device comprising an adjusting nut with a shoulder, the combination of a spring piloted on said adjusting nut, said spring having one or more inoperative coils together with a plurality of operative coils, and means engaging said spring and the shoulder of said nut, said means anchoring said spring longitudinally on said nut.

8. In a spring device, the combination of a nut having a groove, a member having a pair of arms, one of the arms of said member engaging one end of said nut, the other of the arms of said member engaging the groove of said nut, said member locking said nut from rotating relative to said member, an attaching spring mounted on said nut, said member engaging said spring and thereby longitudinally locking said spring on said nut, and means for adjustably engaging said nut.

9. In an adjusting device comprising an adjusting nut, the combination of a resilient member mounted on the outside of said nut and means for rendering a portion of said resilient member ineffective, said means partially enclosing said nut and said resilient member, said means further engaging said nut and said resilient member.

10. In an adjusting nut having a groove, the combination of a member having a pair of arms, one of the pair of arms of said member being provided with a forked end engaging the groove on said nut, and a coil spring mounted on said nut, said spring having one of its coils located within the forked end of said member, and means for operating said adjusting nut.

11. In a spring device, the combination of an adjusting nut, a resilient member mounted on the outside of said nut, and means for rendering ineffective a portion of said resilient member, said means having a forked portion for engaging a portion of said resilient member.

12. In a spring device, the combination of a nut having a groove, a coil spring piloted on said nut, said spring having attaching means at one of its ends, a member engaging the groove together with one end of said nut, said member further engaging said spring, an adjusting screw engaging said nut through said member, and means for supporting said adjusting screw.

13. In a spring device, the combination of an adjusting member, a resilient member longitudinally restrained on the outside of said adjusting member, and a member assembled over said adjusting member and between portions of said resilient member, said resilient member having a portion thereby rendered resiliently inoperative.

JAMES W. ANDERSON.